US012450645B2

(12) United States Patent
Schubilske

(10) Patent No.: US 12,450,645 B2
(45) Date of Patent: Oct. 21, 2025

(54) GOODS TO PERSON ORDER PICKING WITH DISCHARGE MECHANISM

(71) Applicant: Dematic Corp., Grand Rapids, MI (US)

(72) Inventor: Martin E. Schubilske, Brookfield, WI (US)

(73) Assignee: Dematic Corp., Grand Rapids, MI (US)

( * ) Notice: Subject to any disclaimer, the term of this patent is extended or adjusted under 35 U.S.C. 154(b) by 800 days.

(21) Appl. No.: 17/577,580

(22) Filed: Jan. 18, 2022

(65) Prior Publication Data
US 2022/0230229 A1 Jul. 21, 2022

Related U.S. Application Data

(60) Provisional application No. 63/137,884, filed on Jan. 15, 2021.

(51) Int. Cl.
G06Q 30/0601 (2023.01)
B65G 15/22 (2006.01)
G06Q 10/0875 (2023.01)

(52) U.S. Cl.
CPC ......... *G06Q 30/0635* (2013.01); *B65G 15/22* (2013.01); *G06Q 10/0875* (2013.01)

(58) Field of Classification Search
CPC .. G06Q 10/087; B65G 1/1378; B65G 1/1373; B65G 1/1371
USPC .................................. 700/216, 230; 235/385
See application file for complete search history.

(56) References Cited

U.S. PATENT DOCUMENTS

| 5,315,094 A * | 5/1994 | Lisy ..................... B65G 1/1371 |
| | | 198/339.1 |
| 5,582,324 A * | 12/1996 | Pippin ................ B65G 47/8823 |
| | | 221/131 |
| 7,809,467 B2 * | 10/2010 | Schaefer .............. B65G 1/1378 |
| | | 700/216 |
| 2002/0087231 A1 * | 7/2002 | Lewis .................. B65G 1/1373 |
| | | 700/230 |

(Continued)

OTHER PUBLICATIONS

International Search Report and Written Opinion of the International Searching Authority from corresponding Patent Cooperation Treaty (PCT) Application No. PCT/IB2022/050408, indicated completed on Mar. 4, 2022.

*Primary Examiner* — Olusegun Goyea
(74) *Attorney, Agent, or Firm* — Gardner, Linn, Burkhart & Ondersma LLP

(57) ABSTRACT

A system and method for consolidating order items into individual or batch orders within an order fulfilment workstation and discharging the order items to a takeaway device, such as a trackable segmented conveyor. The system includes a temporary holding container at the workstation and a discharge mechanism to release or transfer the contents of the temporary container to the takeaway device. The system and method reduce or eliminate the process of an operator replenishing order transport containers to the workstation once a completed order container has dispatched from the workstation. Empty order containers are supplied the workstation via the takeaway device. The empty order container is positioned adjacent the temporary container such that the discharge mechanism may transfer the order items from the temporary container into the empty order container. The discharge mechanism may transfer the order items directly to the surface of the takeaway device.

19 Claims, 4 Drawing Sheets

(56) References Cited

U.S. PATENT DOCUMENTS

2020/0033883 A1* 1/2020 Theobald ............. G05D 1/0282
2020/0324974 A1* 10/2020 Gorman ............... B65G 11/023

* cited by examiner

GOODS TO PERSON ORDER PICKING WITH DISCHARGE MECHANISM

CROSS REFERENCE TO RELATED APPLICATION

The present application claims priority of U.S. provisional application Ser. No. 63/137,884 filed Jan. 15, 2021, which is hereby incorporated by reference herein in its entirety.

FIELD OF THE INVENTION

The present invention is directed to an order fulfilment system and method, and in particular to an order fulfilment workstation having a reusable order consolidation element and discharge mechanism to transfer order items to an order container.

BACKGROUND OF THE INVENTION

Commonly known goods to person (GTP) order fulfilment solutions include an operator whom picks inventory items to a predetermined order container that is positioned at a pick location within the GTP workstation. Once the order picking for that order container is completed, the order container is discharged or moved from the pick location to be transported away from the GTP workstation. Typically, the GTP workstation requires placement or replacement of empty order containers, such as totes or cartons, at the empty pick locations within the GTP workstation so that an order items for a new order may be picked into the newly placed empty order container. The placement or replacement of empty order containers may be done manually by the operator, requiring the operator to move or reach to retrieve an empty order container and then place it in the empty pick location, or may be done automatically, such as by a robotic arm or a transfer conveyor. Manual placement of empty order containers requires substantial manual labor and a large space to allow for sufficient movement to perform the manual operation.

SUMMARY OF THE INVENTION

The present invention provides a system and method for consolidating order items for a customer order and automatically discharging the consolidated order into an empty, or partially completed, order takeaway container, such as a tote or a shipping carton. The system and method substantially reduce or eliminate the need for automated or manual placement of the order takeaway containers at the picking location, or an order fulfillment workstation, such as in the form of a goods-to-person (GTP) workstation, for example. The order items or components are placed in an order consolidation element or consolidator, such as in the form of a platform or temporary collection/holding compartment or container, which is coupled with a discharge mechanism. The discharge mechanism transfers the order components from the platform to the takeaway device, and may include a chute, pushing arm, and/or tilting tray, for example. After the discharge mechanism transfers the items to the takeaway device, the platform is reused to collect the components of the next order assigned by the order management system. The method is repeated and the operator is never required to manually place or replace an empty order container at a picking location. The takeaway device may include a segmented conveyor with trackable conveyor segments or other form of order collection device that is individually addressable and/or trackable by an order management system to automatically take away the order components in a completed order group or partially complete order group to a downstream solution. Alternatively, the takeaway device could be any other suitable conveyance or transport system, such as A-frame type collection conveyors, monorail or Power and Free conveyors, conveyors marketed and sold by BOSCH®, such as those marketed under the brand REXROTH by Bosch Rexroth AG of Stuttgart Germany, and conveyors with shuttles containing a bucket or tray, for example.

The method includes a picking process to consolidate order items or components by picking/collecting the items in the platform that is actuatable or activated by the discharge mechanism to transfer the order components onto a takeaway device or into an order container at the takeaway device. The operator picking the orders places the order items into one or more platforms at a workstation. The operator may be a human or a robot. Preferably, each platform is utilized for a single/individual order, "pseudo order" collection, or a partial individual order collection. "Pseudo order" collections may include a superset of orders or batch of orders, such as an entire set of e-commerce orders prepared for a single store location (e.g. markets, convenience stores, and retail stores). For example, a pseudo order may include a collection of multiple customer orders that are each pre-consolidated. The pre-consolidated orders are all picked to one of the platforms, to form a superset, batch, or pseudo order. The pseudo order represents a collection of orders to be forwarded to the store location such that the store's orders are already consolidated and ready for pickup at the store location by the store's respective customer.

Once all of required components of the individual order/partial order/pseudo order are collected in the platform, the operator indicates that the order is complete and the items are released via actuation of the discharge mechanism. For example, the discharge mechanism may include a tilting mechanism to tilt the platform so that the components release due gravity onto a tracked segmented conveyor or into a tracked order container supported at the conveyor below the platform. An order management system, including a computer, tracks each of the tracked segments of the conveyor and each tracked order container that is present within the order fulfilment system. Optionally, the takeaway device may be an autonomous mobile robot (AMR).

Optionally, the collection of order items may be discharged directly onto the surface of the segmented conveyor to be transported to a downstream location or process (e.g. packing station). The order management system tracks the collection of order items based on its location on one of the tracked segments of the conveyor. The collection of order items may be transported by the conveyor to another/downstream discharge mechanism where the components are transferred to an order tote or order packaging device.

The system and method are particularly advantageous for labor and floor space reduction, and may reduce labor and/or floor space requirements by as much as 30% or more. The system and method are particularly advantageous for the elimination of an operator needing to manually replace the completed and released order container with an empty container and/or automated mechanisms to automatically replace single use empty container at each workstation. This enables the operator to increase the number of items that can be picked/consolidated for orders (e.g. single order, pseudo orders, or partial orders) within a given time period (e.g. one hour period), thus increasing throughput of the operator and the order fulfilment workstation. The system and method are particularly well suited for order fulfilment applications using automated storage and retrieval systems (ASRS), such as automated grid storage systems like those marketed under the trademark AUTOSTORE® by Autostore Technology AS of Norway.

According to one form of the present invention, an order fulfillment system includes an order management system having a computer adapted to control the order fulfilment system. The system includes one or more order fulfilment workstations for segregating inventory items or components into individual orders (or batch/pseudo orders) to fulfil orders as directed by the order management system. The order fulfilment system includes a takeaway device to transport order containers to and from the workstation. Order containers may include completed order containers with single orders or pseudo orders, partially completed order containers, and empty order containers. Each of the workstations includes multiple order consolidation elements or consolidators, such as in the form of platforms or temporary holding containers, disposed adjacent to the takeaway device and configured to receive order items for a particular order as directed by the order management system. The workstation includes an order discharge mechanism disposed at each of the platforms. The discharge mechanism is selectively operable to transfer the order items from the respective platform to an order container positioned at the takeaway device adjacent to the platform. The order management system may index empty order containers adjacent to platforms by about the time that the order picking operation at the particular platform is completed. Alternatively, the discharge mechanism may transfer the order items directly onto the surface of the takeaway device, without the use of an order container.

In one aspect the platform includes at least one chosen from a bin, a tote, a tray, a shelf, a conveyor belt, a conveying chain, a monorail, a cart, and a pouch. In another aspect, the order discharge mechanism includes at least one of tilt tray forming a portion of the platform, a pivoting/tilting shelf that tilts the entirety of platform toward the takeaway device, a dropout door disposed at a bottom portion of the platform, a pusher arm, and a selectively operable conveyor that directs the order items toward the takeaway device.

In still another aspect, the takeaway device includes a segmented conveyor wherein each segment of segmented conveyor is selectively operable and/or individually addressable by the order management system. Optionally, container brakes or barriers, such as pop-up stoppers may be provided at downstream ends of each segment of the conveyor to provide a temporary barrier to impede order containers along the conveyor. The temporary barriers may be controllable by the order management system.

In yet another aspect, the order management system includes a "pushing" logic, or in other words a prioritization and tracking logic, performed by the computer and adapted to track each of the order containers and direct and move (i.e. "push") the order containers to a desired location within the order fulfilment system. The push logic, as performed by the computer, controls the conveyor to direct each of the orders to a desired location, such as a downstream packing station. The push logic is operable to prioritize the movement or transfer of completed and partially completed order containers from platforms onto the conveyor versus the system's need for empty order containers as required at platforms and/or additional downstream workstations that are downstream of a particular platform that is supporting/buffering a completed or partially completed order container.

According to another form of the present invention, a method for consolidating order items into order containers includes transporting an empty order container to an order fulfilment workstation. The method includes positioning the empty order container adjacent to a consolidation element or consolidator, such as in the form of a platform or temporary holding container, of the workstation. The platform is configured to receive order items for a particular order as directed by an order management system. Once the platform has been filled with the required items for the order, the method includes transferring the order items from the platform to the empty order container with a discharge mechanism and subsequently transporting the completed order container downstream of the order fulfilment workstation with a takeaway device, which may include a segmented conveyor.

In one aspect, the method includes prioritizing and tracking the empty order containers along the segmented conveyor in a manner that optimizes the conveyor capacity while providing a sufficient supply of empty order containers to the order fulfilment workstations to reduce starvation at platforms that have recently discharged a completed collection of order items onto the takeaway device.

In another aspect, the method includes prioritizing resource utilization by balancing the transfer of completed order containers with the need for empty order containers in a manner that permits completed order containers from upstream order fulfilment workstations to be released downstream of the order fulfilment workstation without starving empty order containers downstream workstations. In one aspect, the supply of empty order containers to empty platforms at is prioritized over the release and transport of completed order containers from their respective platform.

Accordingly, the system and method for consolidating orders in an order fulfilment system reduces or eliminates the need for an operator to supply or replenish empty order containers to picking locations within a workstation. The system includes a temporary compartment to receive the order components from the operator, and once the order components are all present, a discharge mechanism transfers the order components from the temporary compartment into an empty order container that is indexed adjacent to the temporary compartment. The filled order container is then released downstream along the conveyor and is tracked by the order management system. Alternatively, the order components may be transferred by the discharge mechanism directly onto the conveyor wherein the components are tracked by the order management system until they reach a desired destination.

These and other objects, advantages, purposes and features of this invention will become apparent upon review of the following specification in conjunction with the drawings.

DESCRIPTION OF THE PREFERRED EMBODIMENTS

Figure 1:
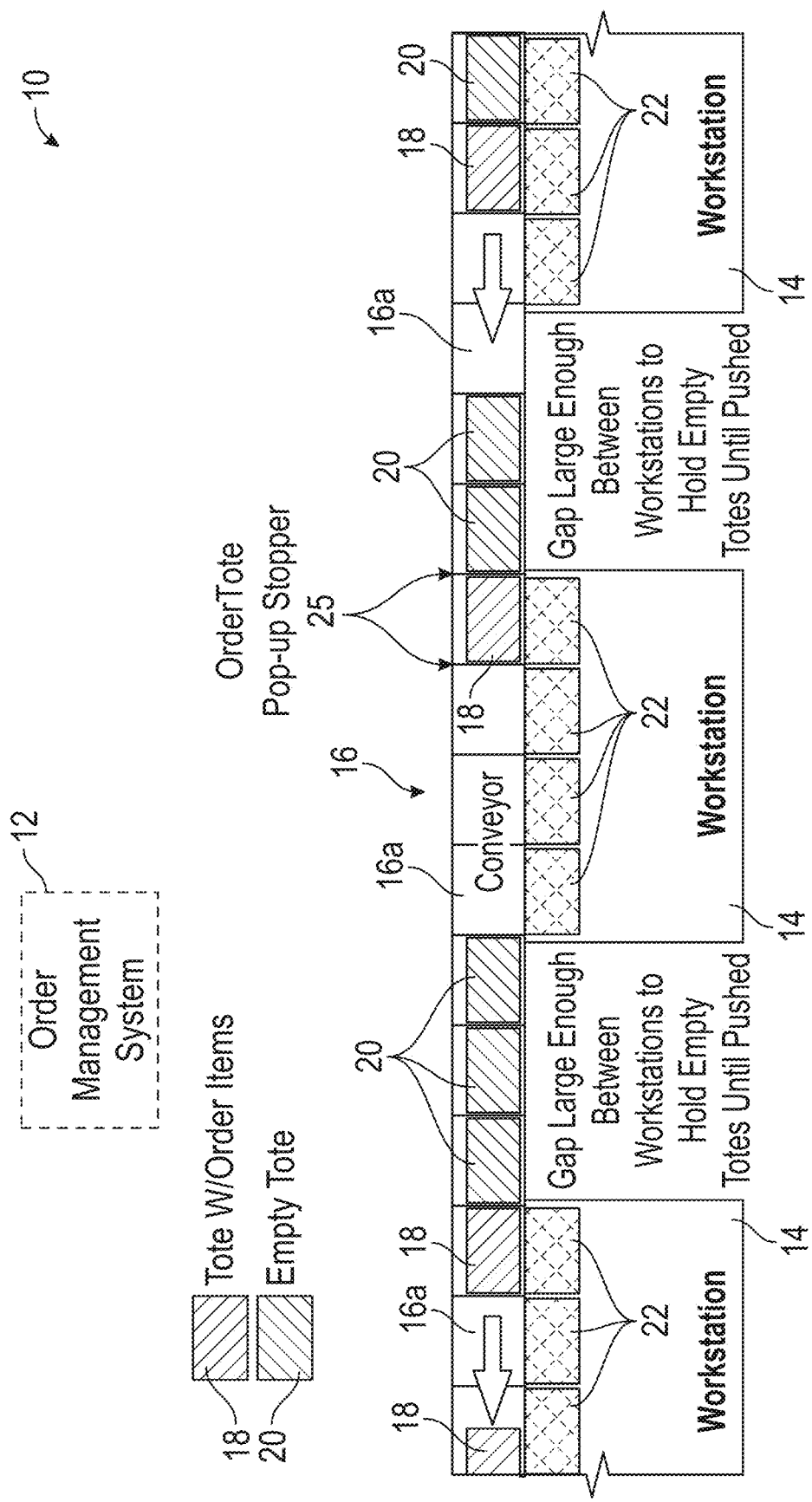
FIG. 1 is a diagrammatic plan view of an order fulfilment system in accordance with the present invention.
Figure 2:
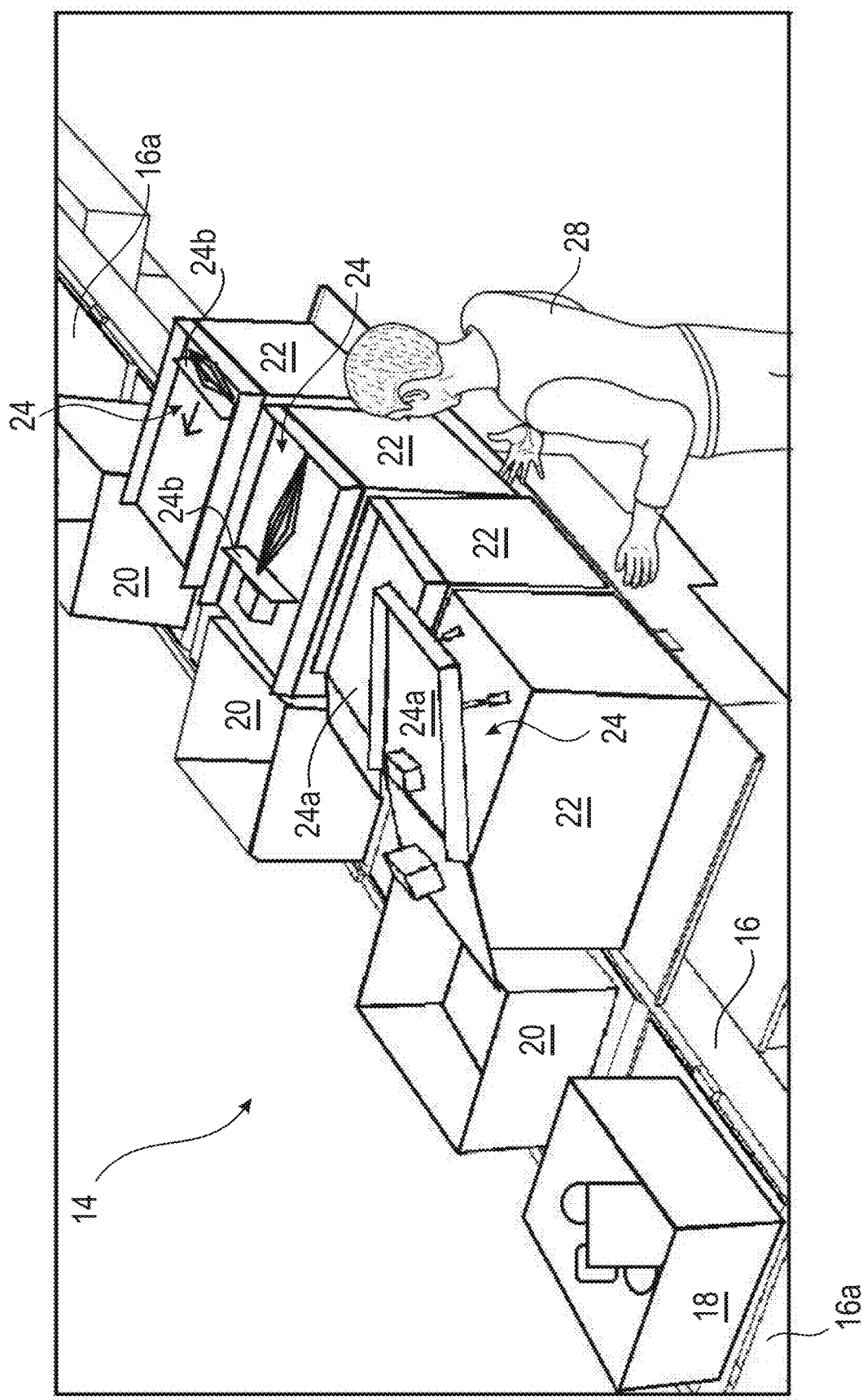
FIG. 2 is a top-side perspective view of an order fulfilment system having a goods-to-person (GTP) workstation with discharge mechanisms, in accordance with the present invention.
Figure 3:
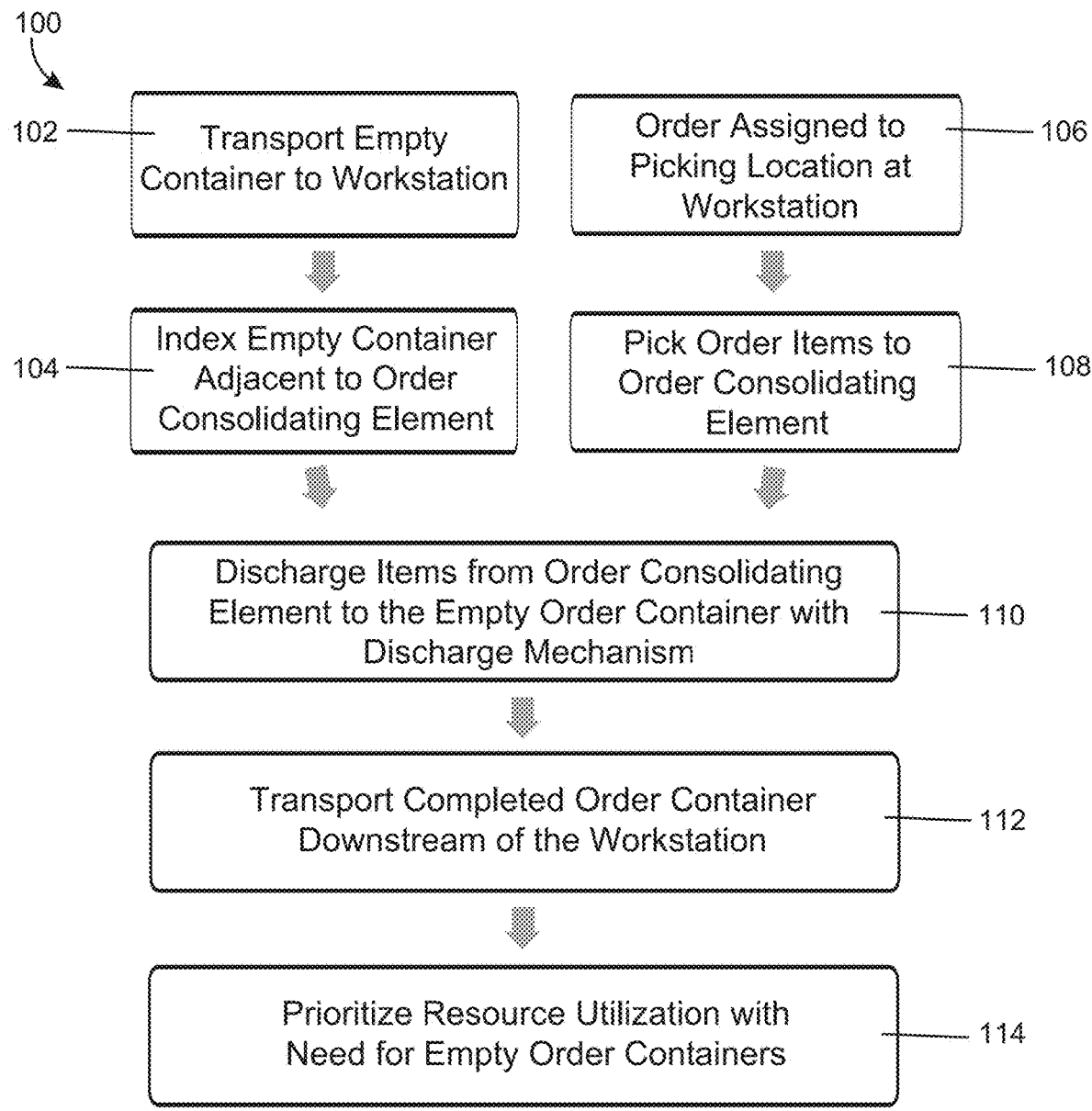
FIG. 3 is a diagram of a method for consolidating order items in an order fulfilment system, in accordance with the present invention.

Referring now to the drawings and the illustrative embodiments depicted therein, an order fulfillment system 10 and a method 100 are provided for consolidating order items or components for a particular customer order (FIGS. 1-3). The fulfilment system 10 includes an order management system 12 having a computer that is adapted to control the order fulfilment system 10 based on the requirements of customer orders. The fulfilment system 10 includes one or more order fulfilment workstations 14 for consolidating or segregating individual inventory items into individual orders and/or batch orders as directed by the order management system 12. The fulfilment system 10 includes a takeaway device or conveyor, such as in the form of a segmented conveyor 16, to transport orders and/or order containers to and from the order fulfilment workstations 14. The orders may be transported directly on the conveyor 16, such as in a collection of order items making up the completed order, or may be transported along the conveyor 16 within order containers. The order containers may include completed order containers 18, partially completed order containers, or empty order containers 20. Each of the order fulfilment workstations 14 includes multiple order consolidation elements or consolidators, such as in the form of platforms or temporary holding containers 22, adjacent to the conveyor 16. Each platform 22 is provided for receiving order items for a particular order as directed by the order management system 12. Each platform 22 represents a picking location to which a picker may place one or more order items for one or more orders (e.g. individual orders, batch orders, pseudo orders, etc.). The workstation 14 includes an order discharge mechanism 24, such as in the form of a tilt or drop dumper 24a, pusher arm 24b and/or a chute 24c, at each of the platforms 22 (FIG. 2). The order discharge mechanism 24 is operable to transfer or release the order items from the respective platforms 22 directly to the conveyor 16 surface or to an empty order container 20 positioned on the conveyor 16 adjacent to the order discharge mechanism 24. The platforms 22 are reusable to fill new orders without the need to replace an order container at the workstation 14 such that after the discharge mechanism 24 has released the order items and returned the platform 22 to its item holding position, the picker may place items on the platform 22 for another order to be filled.

Figure 4:
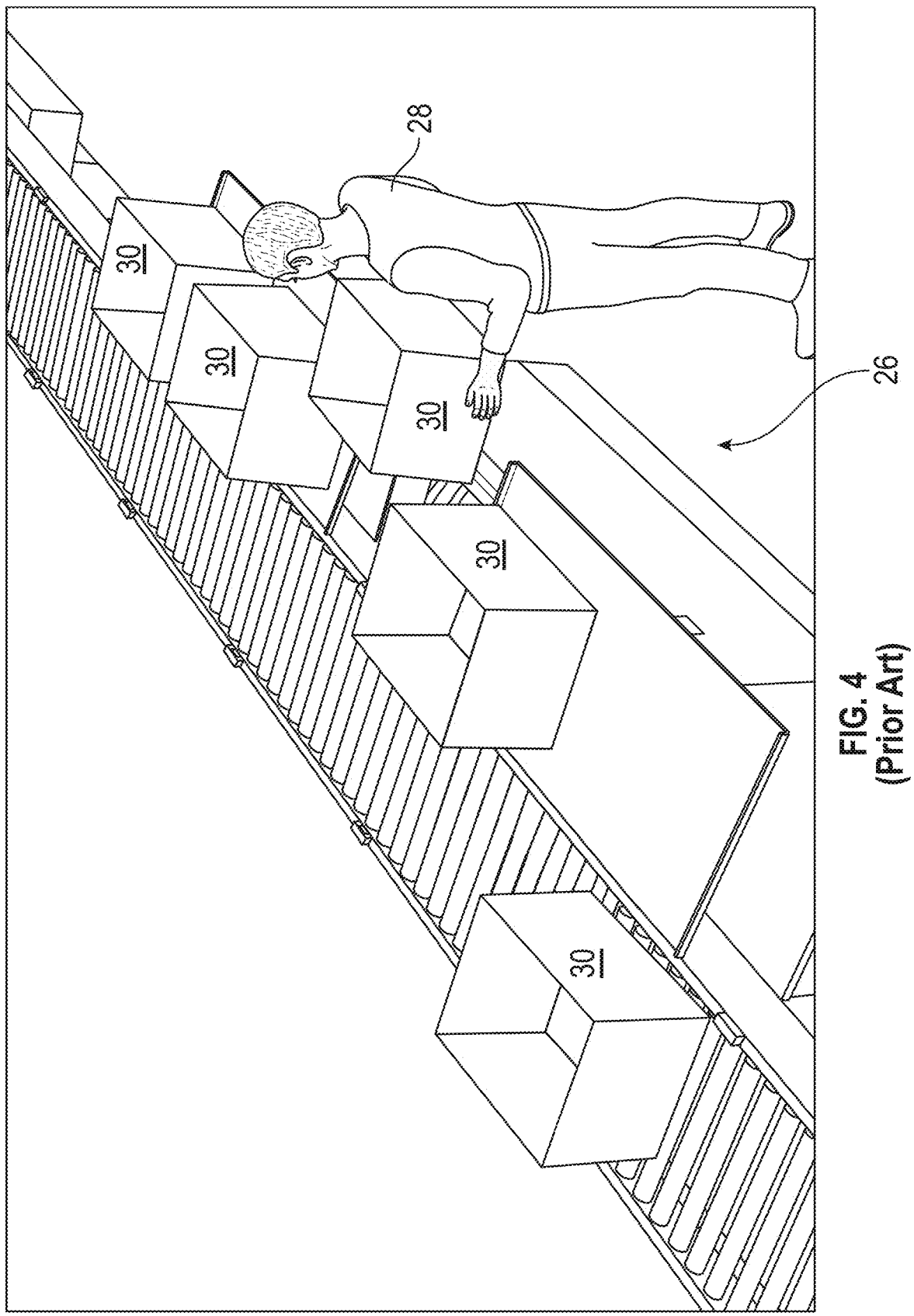
FIG. 4 is a top-side perspective view of an order fulfilment system having a typical goods-to-person (GTP) workstation, as known in the prior art.

The order management system 12 controls the conveyor 16 to index empty order containers 20 (or partially filled/completed containers) adjacent to platforms 22 to provide an empty order container 20 at about or nearly simultaneous to when the order picking operation at the particular one of the platforms 22 is completed and the completed order container 18 is discharged onto the conveyor 16 and moved downstream. The empty order containers 20 (or partially filled order containers) supported on said conveyor 16 may each define an order reception location at which order items may be put to/transferred to from the platform 22. The system 10 and method 100 reduce or substantially eliminate the need for an operator to either transfer completed order containers 18 from the workstation 14 or to replenish, replace, or supply empty order containers 20 to the workstation 14 (which may be required in commonly known goods-to-person order fulfilment workstations, such as the exemplary workstation 26 illustrated in FIG. 4, in which the operator 28 places order items directly into one of multiple order containers 30 and the operator 28 must manually transfer completed containers to the conveyor and/or manually replace the order container 30 when a completed container is removed from the workstation 26).

The platforms 22 may include a bin, a tote, a tray, a shelf, a conveyor belt, a conveying chain, a monorail, a cart, a pouch, or any other suitable consolidation container such as commonly known and commercially available. The order discharge mechanism 24 may include at least one of a tilt tray 24a (FIG. 2) forming a portion of the platform 22, a pivoting/tilting shelf that supports the platform 22, a chute or slide 24c (FIG. 2) adjacent to or forming a portion of the platform 22, a pusher arm 24b (FIG. 2) operable to push items off the platform 22 toward the conveyor 16, a dropout door at a bottom portion of the platform 22, a selectively operable conveyor, and/or any other suitable device for discharging, transferring, or releasing the order components from the platform 22 to the conveyor 16 or into an empty order container 20 adjacent the platform 22. While it may be one scenario that order items are discharged from the platform 22 to an empty order container 20, it will be appreciated that the items may be discharged to a partially filled order container that already contains some order items, such as from an upstream process (e.g. an upstream workstation).

Individual segments 16a of the segmented conveyor 16 may each be selectively operable and/or individually addressable by the order management system 12. The individual segments 16a may each define an order reception location at which order items may be supported directly on the conveying surface of the conveyor 16. Brakes or barriers may be provided with the conveyor 16, such as in the form of pop-up stoppers 25 positioned at downstream ends of each segment 16a to provide a temporary barrier impeding movement of order items or order containers 18, 20 along the conveyor 16 (FIG. 1). The barriers 25 are individually addressable and controllable by the order management system 12. While the takeaway device of the illustrative embodiment of FIG. 1 is depicted as a segmented conveyor 16, it will be appreciated that any suitable conveyance or transportation device may be utilized to transport the order container to and from the workstation 14. For example, roller conveyors, continuous belt conveyors, pouch conveyors, monorail conveyors, power and free conveyors, shuttle/tray conveyors, or the like and/or or autonomous robotic vehicles (e.g. an autonomous mobile robot (AMR)) are contemplated to takeaway or deliver order containers to/away from the workstations 14.

The order management system 12 includes a "pushing" logic, or in other words a prioritization and tracking logic, performed by the computer and adapted to track each of the orders and/or order containers 18, 20 and to direct, move, or push the orders/containers to a desired location within the order fulfilment system 10, such as to a downstream order packaging process, for example. The computer tracks each segment 16a of the conveyor 16 in order to prioritize the resource utilization within the system 10. Preferably, the pushing logic of the management system 12 controls the order fulfilment 10 to only release/transfer completed orders from their respective platform 22 to an empty order container 20 on the conveyor 16 when all downstream workstations 14 and/or platforms 22 of the downstream workstations have sufficient empty order containers 20 immediately available to them (i.e. an empty container 20 at a segment 16a of the conveyor 16 adjacent one or more of the workstations platforms or immediately upstream of the particular workstation 14). As such, the pushing logic controls the conveyor 16 and workstations 14 to move completed order containers 18 downstream as efficiently as possible without impeding the arrival of empty order containers 20 that are required downstream of a particular workstation 14. In other words, a particular completed order 18 may be held or buffered at its respective platform 22 to permit empty order containers 20 to pass along the conveyor 16 to downstream platforms 22 within the same workstation 14 or to downstream workstations 14.

Referring to the illustrative embodiment of FIG. 3, a method 100 is provided for consolidating order items into order containers and includes transporting 102 an empty order container to an order fulfilment workstation, such as the workstation 14 described above and illustrated in FIG. 1. The method 100 includes positioning or indexing 104 an empty order container 20 adjacent to an order consolidation element or picking location, e.g. a platform or temporary holding container 22, of the workstation 14 (FIG. 1). An order management system 12 assigns 106 an order to a platform 22 at the workstation 14 and an operator, either a human or a robot, picks 108 the order items to the assigned platform 22. The platform 22 is provided to receive and retain order items from the operator for the assigned order. When the platform 22 has been filled with the required items for the order, the method 100 includes transferring or discharging 110 the order items from the platform 22 to an empty order container 20 with a discharge mechanism 24. The completed order container is then transported 112 downstream of the order fulfilment workstation 14.

Transporting 102 of the empty order container is performed with a takeaway device, such as a segmented conveyor 16 or an autonomous mobile robot (AMR), for example. Transporting 102 may include indexing empty order containers 20 along the segmented conveyor 16 to optimize the conveyor capacity while providing sufficient empty order containers 20 to the order fulfilment workstation 14 to reduce starvation at the platforms 22 that have completed processing their previous order. The method 100 may include prioritizing or balancing 114 resource utilization in regard to the quantity and location of completed order containers 18 present on the conveyor 16 with the need for empty order containers 20 at the platforms 22. For example, resource utilization may be prioritized in a manner that permits completed order containers 18 from upstream order fulfilment workstations 14 to be released downstream while optimizing the arrival of empty order containers 20 to a particular order fulfilment workstation 14. For example, if a downstream workstation 14 requires empty order containers 20 at one or more platform 22, the method 100 may prioritize 114 sending empty order containers 20 to that downstream workstation 14, in lieu of releasing/transferring completed order containers 18 from upstream workstations 14 onto the conveyor 16. In such a scenario, the completed order containers 18 at upstream workstations 14 are held or buffered at their respective platform 22 to permit the prioritized empty order containers 20 to pass those upstream workstations 14. The completed order containers 18 at the upstream workstations 14 may be released/transferred to the conveyor 16 once the prioritized empty order containers 20 have passed. In other words, because the conveyor 16 is utilized for moving inbound empty/partially empty order containers 20 as well as outbound completed/partially completed order containers 18, the method 100 is well-suited for prioritizing the utilization of the conveyor 16 to execute both inbound and outbound processes. For example, the transfer 110 of outbound, completed order containers 18 to the conveyor 16 may be balanced against the transport 102 of inbound, empty order containers to workstations 14 in a manner that prioritizes the supply of empty order containers 20 to empty platforms 22 over the release 110 and transport 112 of completed order containers 18 from their respective platforms 22.

Alternatively, the steps of method 100 providing an empty order container may be omitted, and the discharge mechanism 24 may discharge/transfer the collection of order components directly from the platform 22 onto the conveyor 16. In such an embodiment, the order management system 12 tracks the order components as they move along the trackable segments 16a of the conveyor 16. The collection of order components are transported directly on the conveyor 16 to a downstream process, such as another workstation 14 or an order packaging process, for example.

Thus, a system and method are provided for picking individual items and consolidating those items into individual orders within an order fulfilment workstation. The method includes discharging the order items for the individual order to a takeaway device, such as a trackable segmented conveyor. The system includes a platform or temporary holding container at the workstation and a discharge mechanism to release or transfer the order contents at the platform onto the segmented conveyor. The system and method substantially reduce or eliminate the need for an operator to (i) manually transfer completed order containers to the segmented conveyor or (ii) manually supply or replenish order transport containers to the workstation once a completed order container has been dispatched from the workstation. As such, labor and space requirements may be significantly reduced by alleviating the operator from having to transfer and/or replenish order containers, thereby increasing operator and workstation throughput and improving resource efficiency. The system and method may also track the orders and/or order containers to prioritize and optimize resource usage, such as by balancing and prioritizing completed order container discharge processes versus empty order container arrivals at the workstation.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An order fulfillment system comprising:
   an order management system comprising a computer adapted to control said order fulfilment system;
   an order fulfilment workstation configured for picking inventory items into individual orders as directed by said order management system;
   a takeaway device to transport orders and/or order containers containing the orders to and from said order fulfilment workstation; and
   said order fulfilment workstation comprising:
   a plurality of order consolidators disposed adjacent to said takeaway device and disposed between an operator and said takeaway device, each order consolidator configured to receive order items for a particular order as directed by said order management system; and
   an order discharge mechanism at each of said order consolidators and configured to transfer the order items from a respective order consolidator of said order consolidators to an order reception location in one of said containers at said takeaway device that is adjacent to said respective order consolidator;

said order management system comprising a prioritization and tracking logic executed by said computer and adapted to track each of the order containers present on said takeaway device and at said reception order locations, wherein each order present on said takeaway device is tracked relative to a respective order reception location at which the order container is positioned, and wherein said prioritization and tracking logic, as executed by said computer, controls said takeaway device to direct each of the order containers to a desired location within said order fulfilment system, said prioritization and tracking logic operable to prioritize movement of the order containers wherein said prioritization and tracking logic is operable to prioritize movement of completed or partially completed order containers on said takeaway device.

2. The order fulfilment system of claim 1, wherein each of said order consolidators comprises at least one chosen from a bin, a tote, a tray, a shelf, a conveyor, a cart, and a pouch.

3. The order fulfilment system of claim 1, wherein each of said discharge mechanisms comprises at least one chosen from a tilt tray defining a portion of the corresponding one of said order consolidators, a pivot shelf supporting the corresponding one of said order consolidators, a dropout door disposed at a bottom portion of the corresponding one of said order consolidators, a pusher arm configured to push items off of the corresponding one of said order consolidators, and a selectively operable conveyor defining a portion of the corresponding one of said order consolidators.

4. The order fulfilment system of claim 1, wherein each of said order reception locations comprises one chosen from (i) a portion of said takeaway device and (ii) an order container supported at said takeaway device, wherein said order container comprises one chosen from a completed order container containing one or more completed orders, a partially completed order container containing one or more at least partially completed orders, and an empty order container.

5. The order fulfilment system of claim 4, wherein said takeaway device comprises a segmented conveyor having a plurality of independent conveyor segments in spaced arrangement with one another and each of said conveyor segments is individually addressable and/or selectively operable by said order management system.

6. The order fulfilment system of claim 4, wherein said prioritization and tracking logic is operable to prioritize movement of completed or partially completed order containers from their corresponding order consolidators against the need for empty order containers required at either of (i) platforms downstream of a particular order consolidator supporting a completed or partially completed order container or (ii) additional order fulfilment workstations downstream of a particular order consolidator supporting a completed or partially completed order container.

7. The order fulfilment system of claim 1, wherein said order reception location comprises an order container supported at said takeaway device, wherein said order management system is operable to index said order container adjacent to one of said order consolidators in a manner that provides an empty order container or partially completed order container at a particular one of said order consolidators at or about simultaneous to completion of an order picking operation at the particular one of said order consolidators.

8. The order fulfilment system of claim 1, wherein said takeaway device comprises an autonomous mobile robot adapted to receive order items from said discharge mechanism and to transport and discharge the order items to a downstream process.

9. A method for consolidating order items into individual or batch orders, said method comprising:
providing an order fulfilment workstation with a plurality of order consolidators, the order consolidators configured to receive order items for a particular order;
providing a takeaway device adjacent the order consolidators;
providing an operator access to the order fulfilment workstation;
disposing the order fulfilment workstation between the operator and the takeaway device;
picking order components to an order consolidator of the order consolidators;
wherein once a respective consolidator of the plurality of order consolidators has been filled with the required order items for the particular order, transferring the order items from the respective order consolidator to an empty or partially empty order reception location at the takeaway device with a discharge mechanism, wherein the order reception location supporting the required order items comprises a completed or partially completed order reception location;
transporting the order items downstream of the order fulfilment workstation with the takeaway device; and
prioritizing utilization of the takeaway device as a function of the need to move a completed or partially completed order container from the consolidator as compared with the need for empty or partially empty order containers downstream.

10. The method of claim 9, wherein the order reception location comprises an order container supported at the takeaway device and wherein said method further comprises:
transporting an empty or partially empty order container to the order fulfilment workstation;
positioning the empty or partially empty order container adjacent to the order consolidator of the order fulfilment workstation such that the discharge mechanism is operable to discharge the order items for the particular order into the empty or partially empty order container; and
wherein said transporting the order items with the takeaway device comprises transporting the completed or partially completed order container with the takeaway device.

11. The method of claim 10, wherein said prioritizing utilization of the takeaway device permits completed or partially completed order containers to be released and transported downstream of the order fulfilment workstation while optimizing the availability of empty or partially empty order containers to downstream processes.

12. The method of claim 9, wherein the takeaway device comprises a segmented conveyor having a plurality of independent conveyor segments in spaced arrangement with one another and each of the conveyor segments is individually addressable and/or selectively operable by the order management system.

13. The method of claim 9, wherein the takeaway device comprises an autonomous mobile robot, the autonomous mobile robot receiving order items from the discharge mechanism and transporting and discharging the order items to a downstream process.

14. The method of claim 9, further comprising configuring the discharge mechanism to transfer the order items from the respective order consolidator to the order reception location at the takeaway device adjacent to the respective order consolidator;

wherein the order reception location comprises one chosen from:

a portion of the takeaway device; and an order container supported at the takeaway device; and wherein the discharge mechanism comprises at least one chosen from:

a tilt tray defining a portion of the respective order consolidator;

a pivot shelf supporting the respective order consolidator;

a dropout door disposed at a bottom portion of the respective order consolidator;

a pusher arm configured to push items off of the respective order consolidator; and a selectively operable conveyor defining a portion of the respective order consolidator.

15. A method for consolidating order items into individual orders, said method comprising:

providing a takeaway device;

transporting an at least partially empty order container to one of a plurality of order fulfilment workstations with the takeaway device;

positioning the at least partially empty order container adjacent to one of a plurality of order consolidators at a particular one of the order fulfilment workstations, each order consolidator configured to receive order items for a particular order as directed by an order management system and to be disposed between an operator and the takeaway device;

when a particular one of the order consolidators has been filled with the required item or items for the corresponding order, transferring the order items from the particular order consolidator to the at least partially empty order container adjacent the order consolidator with a discharge mechanism to form an at least partially completed order container;

transporting the at least partially completed order container downstream of the particular order fulfillment workstation with the takeaway device; and prioritizing utilization of the takeaway device by balancing (i) said transferring of the least partially completed order containers from respective consolidators to the takeaway device with (ii) said transporting the at least partially empty order containers to the order fulfilment workstations in a manner that prioritizes the supply of partially empty order containers to empty order consolidators at the order fulfilment workstations over the release and transport of partially completed order containers from their respective order consolidators.

16. The method of claim 15, wherein said the takeaway device comprises a segmented conveyor, said method further comprising indexing a plurality of the at least partially empty order containers at individual segments of the segmented conveyor in a manner that optimizes capacity of the takeaway device by minimizing starvation of the at least partially empty order containers at the order consolidators of the order fulfilment workstations.

17. The method of claim 16, wherein said balancing is in a manner such that one of the at least partially empty order containers arrives adjacent a particular one of the order consolidators at or about simultaneous to completion of an order picking operation at that order consolidator.

18. The method of claim 16, wherein said balancing is in a manner that prioritizes the supply of the at least partially empty order containers to empty consolidators at the order fulfilment workstations over the release and transport of the at least partially completed order containers from their respective order consolidators.

19. The method of claim 15, wherein the takeaway device comprises an autonomous mobile robot receiving order items from the discharge mechanism and transporting and discharging the order items to a downstream process.

\* \* \* \* \*

UNITED STATES PATENT AND TRADEMARK OFFICE
CERTIFICATE OF CORRECTION

PATENT NO. : 12,450,645 B2  
APPLICATION NO. : 17/577580  
DATED : October 21, 2025  
INVENTOR(S) : Martin E. Schubilske Page 1 of 1

It is certified that error appears in the above-identified patent and that said Letters Patent is hereby corrected as shown below:

In the Claims

Column 9  
Lines 7-8, Claim 1, "said reception order locations" should be --said order reception locations--

Signed and Sealed this  
Twenty-fifth Day of November, 2025

John A. Squires  
*Director of the United States Patent and Trademark Office*